Figure 1:
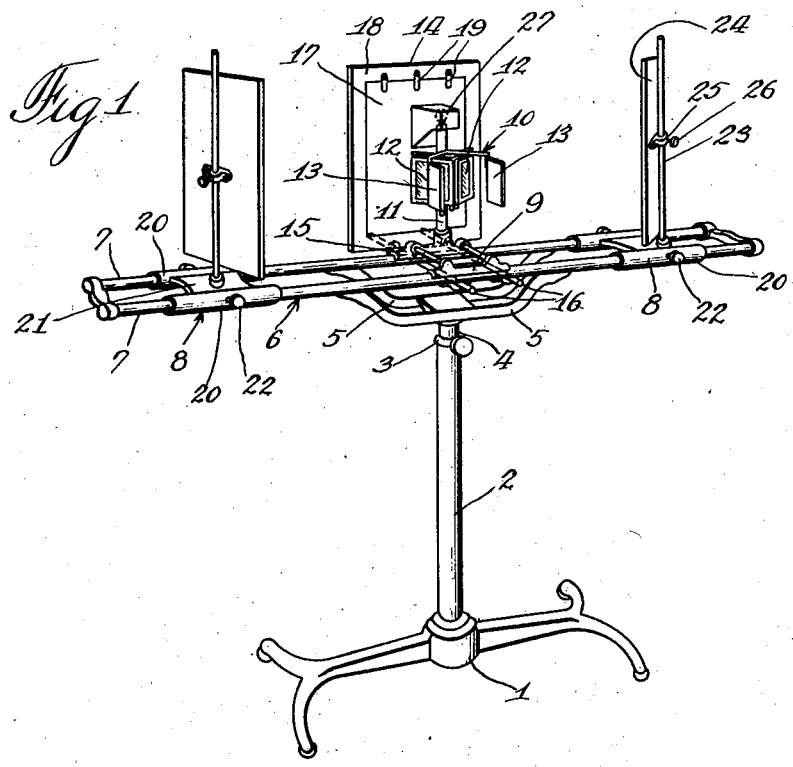

July 27, 1937.   F. L. SMITH   2,088,041
APPARATUS FOR STUDYING X-RAY FILMS AND THE LIKE
Filed May 3, 1933

Inventor:
Frank L. Smith
By Jones, Addington, Ames & Seibold.
Attys

Patented July 27, 1937

2,088,041

UNITED STATES PATENT OFFICE 2,088,041

APPARATUS FOR STUDYING X-RAY FILMS AND THE LIKE

Frank L. Smith, Oak Park, Ill.

Application May 3, 1933, Serial No. 669,140

3 Claims. (Cl. 88—29)

This invention relates to an apparatus and method for viewing a pictorial representation so that the same appears tri-dimensional.

More particularly, this invention relates to an apparatus primarily designed for use in studying X-ray films, plates, or raygraphs, so that with only a single X-ray film the same effect may be produced as when a stereoscope with two films is used.

The apparatus may comprise a single shadow box or support, a view box in front of the shadow box, and a pair of reflecting mirrors positioned on each side of the view box so as to reflect the image of the X-ray film or the like onto said view box, thereby to produce a tri-dimensional image.

The present invention is designed to take the place of the usual stereoscope which is now widely employed in studying X-ray films. In the use of a stereoscope, two X-ray films of the same object or portion of the body taken from slightly different positions are employed. Each film is then placed in a shadow box or the like, spaced apart with their two faces substantially parallel. Midway between the two faces is positioned a V-shaped mirror or view box, so that by looking into the view box the object on the X-ray plates appears tri-dimensional.

When a stereoscope is employed, it is necessary to make two X-ray films of the same identical object. This is very difficult and frequently impossible where the shape of the object is constantly changing, such as that of the heart, stomach, etc. It is also very inconvenient if not impossible in certain instances to make two identical X-ray films of a tooth or other object, where the position of the X-ray machine with respect to the object cannot be exactly controlled.

In the present invention, where only a single X-ray film, plate, or raygraph is employed, the disadvantages inherent in the use of a stereoscope may be done away with, and X-ray films of constantly moving objects or the teeth may be viewed so as to appear tri-dimensional.

Through the use of a single X-ray plate, film, or raygraph, instead of the two necessary with a stereoscope, the cost of the X-ray films is very materially reduced. At the same time, the cost of operating the X-ray machine and the wear on the same is materially cut down.

An object of the present invention is to provide an apparatus whereby a single X-ray film, plate, or raygraph may be viewed and will appear tri-dimensional.

Another object of this invention is to produce such an apparatus in which the apparent depth of the object or portion of the body being viewed may be increased or decreased at the will of the operator of the apparatus.

A further object of this invention is to provide an apparatus for viewing X-ray films, plates, or raygraphs so that the same will appear tri-dimensional.

A still further object is to provide an apparatus of the type referred to above, which will be of simple construction and may be easily operated.

Further objects and advantages will be apparent from the following description when taken together with the accompanying drawing, in which latter—

Figure 2:
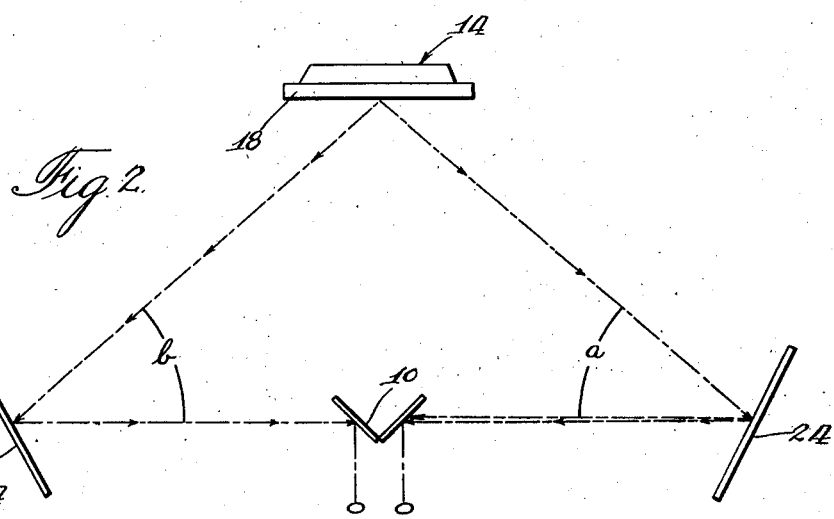

Figure 1 is a perspective view of a form of apparatus embodying the present invention, and Fig. 2 is a diagrammatic view of some of the more important features of the same.

Referring more particularly to the drawing, there is shown a base 1 having a standard 2 comprising a hollow, vertical tube extending upwardly therefrom. A locking collar 3 having the usual locking unit is provided at the upper end of standard 2. A second standard 4 is slidably mounted in standard 2. Brackets 5 carried on the upper end of standard 4 support the top portion or tracks 6 upon which other units of the device, hereinafter to be discussed, are mounted. The top portion 6 preferably comprises two spaced parallel rods or tracks 7, upon which are slidably mounted two carriages 8 and a carriage 9 intermediate the carriages 8.

Mounted on carriage 9 is a view box 10 supported on a standard 11. The view box, which may be of usual construction, may comprise two converging mirrors 12 and a pair of shields or blinders 13. The view box is preferably provided with means (not shown) for angular adjustment, tilting adjustment, and vertical adjustment. If desired, instead of mounting the view box on the adjustable carriage 9, it may be rigidly fastened to the top portion 6 intermediate the ends thereof.

Positioned a distance behind the view box 10 is a shadow box 14 which may be provided with clamps 15 on the bottom thereof for engaging brackets or rods 16 which extend substantially at right angles to the track 7. By this means the shadow box or support may be moved toward and away from the view box 10. Any other means may be employed for adjustably mounting the shadow box. The shadow box or support may be provided with a translucent glass front 17 mounted in a frame 18. An electric lamp or other source of light (not shown) may be provided in the shadow box, as is usual. Clips 19 are provided for holding the X-ray film, plate, or raygraph, or other pictorial representation which it is desired to examine, in proper position on the shadow box.

Each carriage 8 may comprise two sleeve members 20 connected by a plate 21. Screws or other securing means 22 may be provided in the sleeves for holding the carriage 8 in place after it has been properly positioned. One of the carriages 8 is mounted on each side of the view box, and extending upwardly from each carriage 8 is a standard 23 upon which may be adjustably mounted a mirror or other suitable reflecting surface 24. A bracket 25 secured to the mirror 24 fits about the standard 23. Screws or other means 26 may be provided in the brackets 25 so that the mirror may be held in proper position. Any other suitable means for adjustably mounting the mirrors may be employed. It may be desirable in some cases to connect the mirrors 24 together so that they may be simultaneously adjusted. The mirrors are arranged, as shown particularly in Fig. 2, so as to reflect the image of the X-ray film, plate, or raygraph mounted on the shadow box 14 onto the view box 10.

When a raygraph or the like is to be studied, it is necessary to illuminate the face thereof rather than to provide a light behind the same as when studying X-ray films. For this purpose, a reflector 27 may be provided on the top of standard 11 above view box 10. An electric bulb or other source of light is provided therein which serves to illuminate the face of the pictorial representation to be studied.

With the heretofore described apparatus the apparent depth of the object being examined may be increased or decreased by proper adjustment of the apparatus. The apparent depth may be increased by moving the mirrors 24 outwardly, further away from the view box 10. The apparent depth of the object being examined may also be increased by adjusting one of the mirrors 24 so that the image is reflected onto its adjacent mirror of the view box slightly to the rear of the reflection onto the other mirror of the view box. In other words, angle a may be slightly more acute than angle b, Fig. 2. The same result may also be accomplished by other means. The apparent depth of the object may be decreased by reversing the above mentioned steps.

Throughout the specification and claims, wherever the expression "pictorial representation" is used it is intended to cover X-ray films, plates, raygraphs, or the like.

Although a particular type of view box has been described, any other which will produce a similar result may be employed.

Through the use of the apparatus hereinabove described, a single X-ray plate, film, or raygraph may be examined, and the apparatus will make it appear tri-dimensional. Furthermore, the apparent depth of the object under examination may be increased or decreased at will by simple adjustment of the apparatus.

While I have shown and described a preferred embodiment of the present invention, it is apparent that many modifications may be made without departing from the spirit and scope thereof, and, therefore, I wish to be limited only by the prior art and the appended claims.

I claim:

1. A device of the character described comprising a base member, a support for a pictorial representation to be viewed adjustably mounted on said base member, a view box, and a reflecting surface on each side of said view box for reflecting the image of a single pictorial representation mounted on said support onto said view box with the image from one reflecting surface slightly offset with respect to the image from the other reflecting surface so that the image appears tri-dimensional, said view box and said reflecting surfaces being adjustably mounted on said base.

2. A device of the character described comprising a base member, a support for a pictorial representation to be viewed adjustably mounted on said base member, a view box having a pair of converging mirrors, and a reflecting surface on each side of said view box for reflecting the image of a single pictorial representation mounted on said support onto said view box with the image from one reflecting surface slightly offset with respect to the image from the other reflecting surface so that the image appears tri-dimensional, said reflecting surfaces being independently adjustably mounted on said base and said view box being adjustably mounted on said base.

3. A device of the character described comprising a base member, a support for a pictorial representation to be viewed adjustably mounted on said base member, a view box having a pair of substantially vertical converging mirrors and a substantially vertical reflecting surface on each side of said view box for reflecting the image of a single pictorial representation mounted on said support onto said view box with the image from one reflecting surface slightly offset with respect to the image from the other reflecting surface so that the image appears tri-dimensional, said view box and said reflecting surfaces being adjustably mounted on said base.

FRANK L. SMITH.